United States Patent Office 2,813,745
Patented Nov. 19, 1957

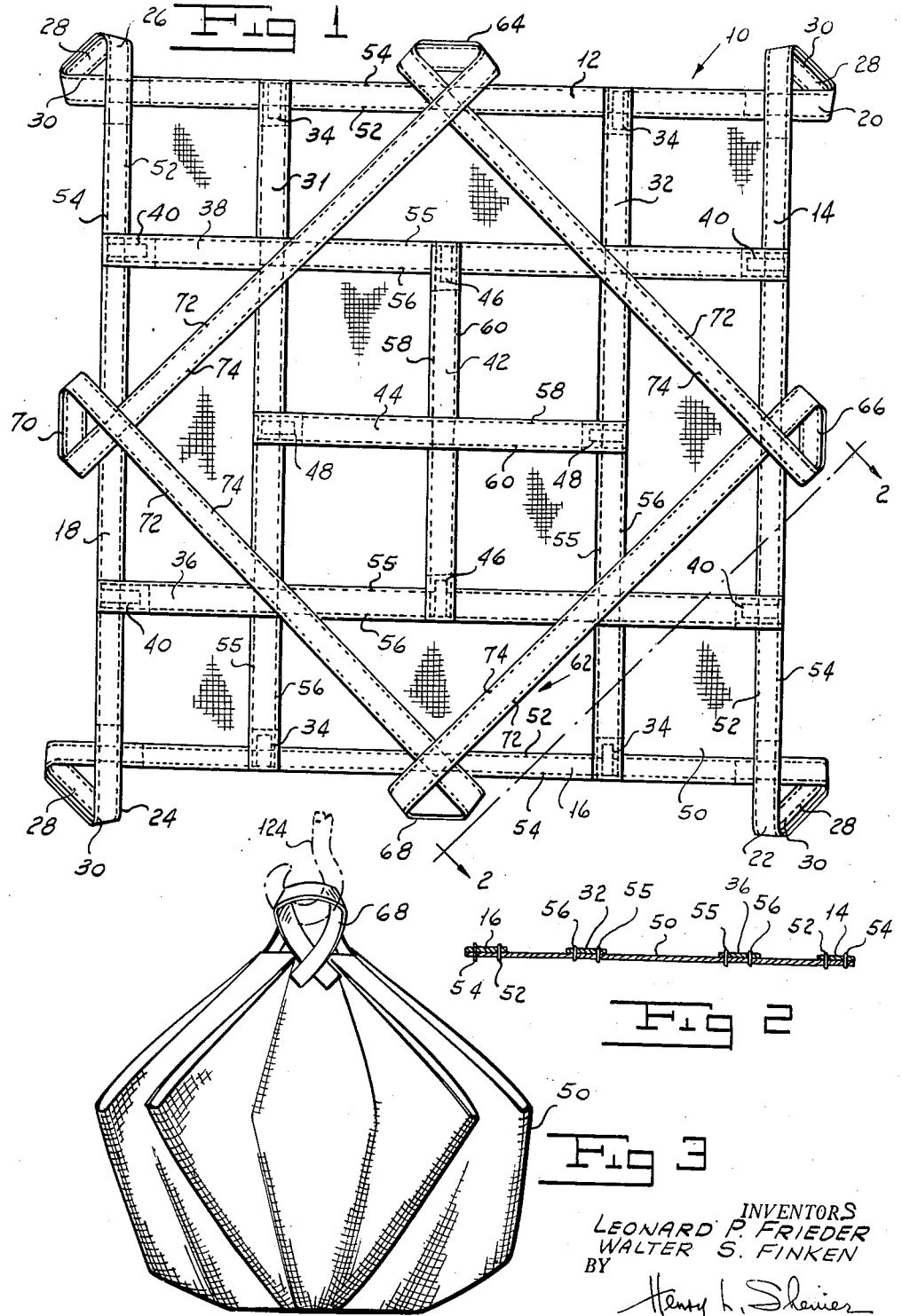

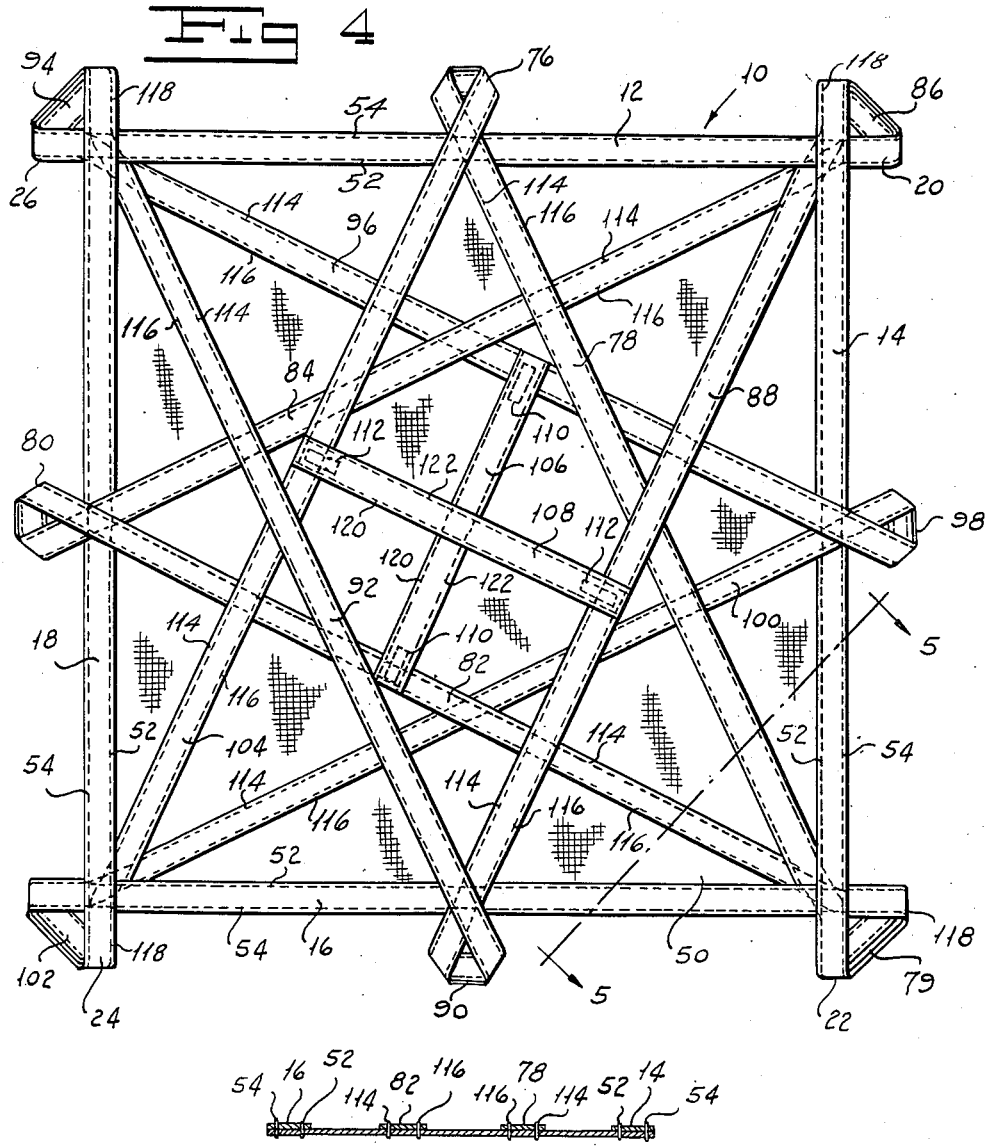

2,813,745

CARGO SLING

Leonard P. Frieder, Great Neck, and Walter S. Finken, Brooklyn, N. Y.; said Finken assignor to said Frieder Application January 4, 1955, Serial No. 479,743

12 Claims. (Cl. 294—77)

Our invention relates to a cargo sling and more particularly to an improved cargo sling which is capable of handling powdered or comminuted material, which sling is strong, and which sling has an extremely long life.

Cargo nets are known in the prior art for transferring articles of material, equipment, and the like, forming cargo between ships and between the shore and ship. These nets are customarily formed by a plurality of individual net mesh members interlocked to form the net body. At spaced points around the periphery of the net body, suspension means are secured thereto for supporting the nets in use. In the cargo nets of the prior art, the disposition of the supporting means around the border of the net body and the relative disposition of the individual net mesh members are such that a load applied to an individual net mesh member is not distributed among the remaining net mesh members but is absorbed solely by the member to which it is applied.

In our copending application, Serial No. 449,893, filed August 16, 1954, we disclosed a webbing cargo net in which a load applied to an individual net mesh member is distributed among the remaining net mesh members rather than merely being absorbed by the member to which it is applied. The forms of cargo net disclosed in our said copending application, as well as the forms of cargo net known in the prior art are adapted to handle only large articles which will not slip or pass through the net openings formed by the net mesh members. These nets are not especially adapted for handling bulk cargoes of particles such as flour or other comminuted materials in bulk, since such materials in bulk readily pass through the openings in the net. Moreover, the configurations of nets of the prior art do not permit a large quantity of such material to be carried by the net without spilling over the edge of the net. It will be appreciated that these nets sway in use with the result that a quantity of the material carried by the net may spill over the net periphery. This problem, of course, does not arise where large articles are being carried, as is contemplated in cargo nets of the prior art.

We have invented a cargo sling which is an improvement over the cargo nets of the prior art and over the cargo net disclosed in our said copending application. Our sling is especially adapted to handle powdered or comminuted material such as flour or the like in bulk. Our sling is strong and capable of handling very heavy loads. We provide our sling with means for gathering the border of the sling to prevent spillage of the material carried therein over the edge of the sling. This gathering means also provides a means by which a loaded sling may be upset to spill the material carried therein at the delivery location.

One object of our invention is to provide a cargo sling which is especially adapted to handle powdered or comminuted material.

Another object of our invention is to provide a cargo sling which is sufficiently strong to handle extremely heavy loads of comminuted material.

A further object of our invention is to provide a cargo sling having means by which the border of the sling may be gathered to form a baglike sling and prevent spillage of the material carried thereby.

A still further object of our invention is to provide a cargo sling for carrying comminuted material having means for upsetting the sling to spill the material carried therein at the location at which it is to be delivered.

Other and further objects of our invention will appear from the following description.

In general, our invention contemplates the provision of a cargo sling including a peripheral or border member in which a number of sling suspension means are formed. The peripheral member carries a plurality of relatively angularly disposed intersecting mesh members. We secure a retaining fabric to the peripheral member and to the individual mesh members to adapt our sling to support a load of comminuted or powdered material. The arrangement of the individual mesh members on the peripheral member with respect to the sling suspension means is such that a load applied to any individual mesh member is distributed among a plurality of mesh members. This arrangeemnt also ensures that the fabric backing of the sling will be stressed ont he bias so that full advantage is taken on the strength of the fabric. We provide our sling with means for gathering the peripheral member to avoid spilling of the material carried by the sling. This last means may also be used to upset or dump the sling to spill the material carried therein at the delivery location.

In the accompanying drawings which form part of the instant specification and which are to be read in conjunction therewith and in which like reference numerals are used to indicate like parts in the various views:

Figure 1 is a plan view of one form of our cargo sling.

Figure 2 is a sectional view of the form of our cargo sling shown in Figure 1 taken along the line 2—2 of Figure 1.

Figure 3 is a perspective view, drawn on a reduced scale, of our cargo sling when carrying a load.

Figure 4 is a plan view of a second form of our cargo sling.

Figure 5 is a sectional view of the form of our cargo sling shown in Figure 4 taken along the line 5—5 of Figure 4.

More particularly referring now to Figures 1 and 2 of the drawings, our cargo sling includes a peripheral member, indicated generally by the reference character 10 having respective sides 12, 14, 16, and 18 in the form shown. The peripheral member 10 may be formed of a continuous length of fabric webbing. In order to provide a means for suspending the sling, we form a number of respective loops 20, 22, 24, and 26 at the four corners of the peripheral member 10. We reinforce these suspending loops by lengths 28 of webbing secured to the peripheral member 10 by stitching 30.

We secure a plurality of individual mesh members to the peripheral member 10 at spaced locations therealong. A first pair of members 31 and 32 extends between side 12 and side 16. The ends of these members pass around the respective sides and are secured thereto by stitching 34. A second pair of mesh members 36 and 38 extend between the sides 14 and 18. The ends of these mesh members 36 and 38 pass around the respective sides 14 and 18 and are secured thereto by stitching 40.

We provide a pair of reinforcing members 42 and 44 at the center of the sling. The ends of member 42 pass respectively about mesh members 36 and 38 and are secured thereto by stitching 46. The ends of reinforcing member 44 pass about the respective mesh members 31 and 32 and are secured thereto by stitching 48.

In order to adapt our sling for carrying comminuted material, such as flour or the like, we secure a tightly woven fabric 50 of any suitable material to the members making up the sling. This fabric 50 is impervious to the passage of powdered material therethrough. A pair of parallel lines of stitching 52 and 54 on each of the sides of peripheral member 10 secures the fabric 50 to the peripheral member 10. Parallel lines of stitching 55 and 56 secure the fabric 50 to each of the respective individual mesh members 31, 32, 36, and 38. Additional lines of stitching 58 and 60 secure each of the respective supporting members 42 and 44 to the fabric 50.

We provide the form of our sling shown in Figure 1 with means for gathering the peripheral member 10 when the sling is in use to prevent spilling of the carried material. A continuous length of fabric webbing or the like, indicated generally by the reference character 62, forms a loop 64 adjacent the mid-point of side 12 and passes to a point adjacent the mid-point of side 14, at which it forms a second loop 66. From loop 66 the length 62 extends to a point adjacent the mid-point of side 16 at which it forms a loop 68. The length 62 then extends to a point adjacent the mid-point of side 18 at which it forms a loop 70, from whence length 62 passes to loop 64. We terminate the ends of length 62 at any convenient point. We provide parallel lines of stitching 72 and 74 on each of the respective portions of length 62 to extend between a pair of adjacent loops 66 and 68. These lines of stitching secure the length 62 and loops formed therein to the sling peripheral member 10, to the mesh members, and to the fabric 50.

It is to be understood that the webbing of which peripheral member 10, mesh members 30, 32, 36, and 38, reinforcing members 42 and 44, and length 62 are formed may be any suitable textile webbing. It may be of cotton, for example. Preferably, however, we form the webbing from yarns made up of continuous synthetic filament threads having a predetermined number of convolutions per unit length, as disclosed in our said copending application. This provides a lightweight sling construction which is singularly strong and rugged. Further, while we have shown our sling as having a square configuration, it is to be understood that any other suitable geometric shape may be employed.

Referring now to Figures 4 and 5, this form of our sling includes a peripheral member 10 formed in a manner similar to that in which the member 10 of the form of our sling shown in Figure 1 was formed. It also includes respective sides 12, 14, 16, and 18 and is formed with suspension loops 20, 22, 24, and 26 at the corners thereof. In this form of our invention, however, the individual mesh members may be formed from a continuous length of textile webbing. This length of webbing conveniently is formed with a first upsetting loop 76 adjacent the mid-point of side 12. From this loop 76 a mesh member 78 extends to suspension loop 22. The length of material passes around the inside of loop 22 to form a reinforcing loop 79 and then passes from loop 22 to a second upsetting loop 80 adjacent the midpoint of side 18 to form a second mesh member 82. From loop 80 a mesh member 84 extends to suspension loop 20 where it forms a reinforcing loop 86 within the suspension loop 20. A mesh member 88 extends from loop 20 to a third upsetting loop 90 located adjacent the mid-point of side 16. From loop 90, a mesh member 92 extends to suspension loop 26 where it forms a reinforcing loop 94. From loop 94 a mesh member 96 extends to an upsetting loop 98 located adjacent the midpoint of side 14. From loop 98 a mesh member 100 extends to suspension loop 24 where it forms a reinforcing loop 102. From loop 102 a mesh member 104 extends to upsetting loop 76. As has been explained hereinabove, the individual mesh members, the reinforcing loops for the sling suspending loops, and the upsetting loops in this form of our invention may be formed from a continuous length of webbing, the ends of which may terminate at any convenient point along the length. It is to be understood, of course, that a number of individual lengths may be employed if desired.

At the center of this form of our sling, we provide a pair of reinforcing members 106 and 108. The ends of member 106 pass around the respective mesh members 82 and 96 and are secured thereto by stitching 110. The ends of member 108 pass around the respective mesh members 88 and 104 and are secured thereto by stitching 112. As was the case with the form of our invention shown in Figure 1, parallel lines of stitching 52 and 54 may conveniently secure the peripheral member 10 to the fabric backing 50. Parallel lines of stitching 114 and 116 on each of the respective mesh members 78, 82, 84, 88, 92, 96, 100, and 104 secure the mesh members to the fabric 50 and to the peripheral member 10. We may employ stitching 118 to secure the respective reinforcing loops 86, 79, 102, and 94 to suspension loops 20, 22, 24, and 26. Reinforcing members 106 and 108 are each secured to the fabric 50 by parallel lines of stitching 120 and 122. The webbing, of which the mesh members of this form of our invention are made, is formed preferably from yarns made up from synthetic, continuous filament threads having a predetermined number of convolutions per unit length.

In use of the form of our invention shown in Figures 1 and 2, when a quantity of comminuted material is to be carried in the sling, the sling is laid out on a flat surface and the material is deposited thereon. Suitable hoisting means, such as a hook 124 or the like, shown in Figure 3, is passed through the sling suspension loops 20, 22, 24, and 26. At the same time, the hook 124 may be passed through the gathering or upsetting loops 64, 66, 68, and 70. It will be appreciated that the loops 20, 22, 24, and 26 function primarily as suspension means for supporting the load of comminuted material carried by the sling. As can be seen by reference to Figure 1, no individual mesh member 31, 32, 36, or 38 extends directly between a pair of suspension members. As a result of this construction, the load carried by any individual mesh member is not supported only by that mesh member, but is distributed among the other mesh members. Consequently, an extremely heavy load may be carried by the sling without the danger of rupturing a suspension loop or one of the individual mesh members. The loops 64, 66, 68, and 70 function primarily to gather the peripheral member 10 when the sling carries a load. These loops, together with the portions of length 62 between adjacent lops, shape the sling to prevent spilling of the carried material. When the sling and its load have been moved to a position where the material is to be delivered, the load may readily be dumped by removing one of the upsetting loops 64, 66, 68, or 70 from hook 124. This action causes the load to shift to upset the sling and deliver the material at the desired location. Reinforcing members 42 and 44 aid in forming a base for the sling upon which most of the load is supported. The fabric 50 is so formed that powdered material, such as floor or the like, will not sift through the fabric. The arrangement of this form of our invention is such that the stress applied to the fabric 50 as a consequence of the load carried thereby is on the bias. That is, the fabric 50 is stressed at an angle to the direction of weaving thereof to take full advantage of the fabric strength.

In use of the form of our invention shown in Figure 4, the suspension members 20, 22, 24, and 26 are placed on the hoisting means in the same manner as were the loops of the form of our invention shown in Figure 1. Similarly, upsetting loops 76, 80, 90, and 98 are placed on the hoisting means. When the load has been delivered to a desired location, one of the upsetting loops is removed from the hoisting means and the material is spilled out of the sling. This form of our invention is the preferred form. We dispose the warp and woof of the fabric 50 at an angle to the individual mesh members. This disposition of the fabric 50 stresses it on the bias and takes advantage of its full strength.

It will be seen that we have accomplished the objects of our invention. We have provided a cargo sling which is especially adapted to carry comminuted or powdered material. Our sling is strong and rugged and is capable of carrying an extremely heavy load. We have provided our sling with means for gathering the peripheral member of the sling to prevent spillage of the material carried thereby. This means may also function as a sling upsetting means to spill the material at the location at which it is to be delivered.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A cargo sling for handling comminuted material in bulk including in combination a peripheral member, a plurality of intersecting mesh members secured to said peripheral member, a plurality of suspension means carried by said peripheral member, and a backing secured to said peripheral member and said mesh members, said backing being substantially impervious to the passage of said comminuted material therethrough.

2. A cargo sling as in claim 1 in which said suspension means are loops formed in said peripheral member.

3. A cargo sling as in claim 1 in which said peripheral member and said mesh members are formed of fabric webbing.

4. A cargo sling as in claim 1 including reinforcing members carried by said mesh members, said reinforcing members being located centrally of said peripheral member.

5. A cargo sling as in claim 1 including means for gathering said peripheral member to prevent spillage of the carried material.

6. A cargo sling as in claim 1 including a plurality of gathering loops secured to said peripheral members and sling forming members extending between adjacent gathering loops, said gathering loops serving to gather said peripheral member and said sling forming members serving to afford said sling a baglike configuration when said sling is in use.

7. A cargo sling as in claim 1 in which said peripheral member and said mesh members are formed of fabric webbing made up of yarns formed of continuous synthetic filament threads spun to a predetermined number of convolutions per unit length.

8. A cargo sling as in claim 1 in which said peripheral member is formed of fabric webbing, said suspension means being loops formed along the length of said webbing, and reinforcing means for said loops.

9. A cargo sling as in claim 1 in which said peripheral member is substantially square, said mesh members extending substantially perpendicularly with respect to said peripheral member.

10. A cargo sling as in claim 1 in which said perpiheral member lies along the locus of a polygon having a plurality of sides and a plurality of apices, each of said mesh members extending from one of said apices to a point adjacent the mid-point of one of said sides.

11. A cargo sling as in claim 1 in which said peripheral member lies along the locus of a polygon having a plurality of sides and a plurality of apices, each of said mesh members extending from one of said apices to a point adjacent the mid-point of one of said sides, said mesh members being adapted to be formed of a continuous length of fabric webbing, and a plurality of loops formed in said length adjacent the mid-points of said sides.

12. A cargo sling as in claim 1 in which said suspension means are located at predetermined spaced points around said peripheral member and in which each of said mesh members includes an end secured to the peripheral member at a point between a pair of suspension means to provide a relative angular disposition of said mesh members such that a load applied to one of said mesh members is distributed among the remainder of said mesh members.

References Cited in the file of this patent

UNITED STATES PATENTS

| | | |
|---|---|---|
| 1,188,185 | Krulish | June 20, 1916 |
| 2,342,455 | Dahlander | Feb. 22, 1944 |
| 2,440,712 | Bickell | May 4, 1948 |
| 2,705,461 | Campbell | Apr. 5, 1955 |
| 2,734,543 | Hunter | Feb. 14, 1956 |
| 2,749,957 | Smith | June 12, 1956 |

FOREIGN PATENTS

| | | |
|---|---|---|
| 32,401 | Netherlands | July 15, 1932 |